(12) United States Patent
Sawada

(10) Patent No.: US 7,333,249 B2
(45) Date of Patent: Feb. 19, 2008

(54) IMAGE READING DEVICE

(75) Inventor: Hideki Sawada, Kyoto (JP)

(73) Assignee: Rohm Co., Ltd., Osaka (JP)

( * ) Notice: Subject to any disclaimer, the term of this patent is extended or adjusted under 35 U.S.C. 154(b) by 411 days.

(21) Appl. No.: 10/542,078

(22) PCT Filed: Jan. 15, 2004

(86) PCT No.: PCT/JP2004/000262

§ 371 (c)(1),
(2), (4) Date: Jul. 13, 2005

(87) PCT Pub. No.: WO2004/064380

PCT Pub. Date: Jul. 29, 2004

(65) Prior Publication Data

US 2006/0098247 A1 May 11, 2006

(30) Foreign Application Priority Data

Jan. 16, 2003 (JP) .............................. 2003-008476

(51) Int. Cl.
H04N 1/04 (2006.01)

(52) U.S. Cl. ...................... 358/484; 358/475; 358/483; 358/482; 358/474; 250/208.1; 250/227.11; 250/227.2; 362/610; 362/551

(58) Field of Classification Search ................ 358/484, 358/475, 509, 483, 482, 512–514, 505, 474; 250/227.11, 216, 227.2, 208.1; 362/610, 362/551; 399/220, 221
See application file for complete search history.

(56) References Cited

U.S. PATENT DOCUMENTS

| 6,259,082 | B1 * | 7/2001 | Fujimoto et al. | ......... 250/208.1 |
|---|---|---|---|---|
| 6,417,508 | B1 * | 7/2002 | Ogura et al. | ............. 250/227.2 |
| 6,724,503 | B1 * | 4/2004 | Sako et al. | ................. 358/483 |
| 2001/0003504 | A1 * | 6/2001 | Ishihara et al. | ............... 362/31 |
| 2006/0050390 | A1 * | 3/2006 | Sawada | ...................... 359/516 |
| 2006/0152772 | A1 * | 7/2006 | Sawada | ...................... 358/474 |

FOREIGN PATENT DOCUMENTS

| JP | 10-107959 | 4/1998 |
|---|---|---|
| JP | 10-173870 | 6/1998 |
| JP | 10-276298 | 10/1998 |
| JP | 2001-125080 | 4/2000 |

* cited by examiner

Primary Examiner—Cheukfan Lee
(74) Attorney, Agent, or Firm—Hamre, Schumann, Mueller & Larson, P.C.

(57) ABSTRACT

An image reading device includes light-emitting diode chips (11A-11C) and a light guide (3) having a main region (3A) and a subsidiary region (3B). The subsidiary region (3B) includes a light incident surface (31) located above the light source (11A-11C) and an inclined surface (32). The light source (11A-11C) is offset in a direction receding from the main region (3A) with respect to the center (C2) as viewed in the primary scanning direction of the light incident surface (31).

9 Claims, 6 Drawing Sheets

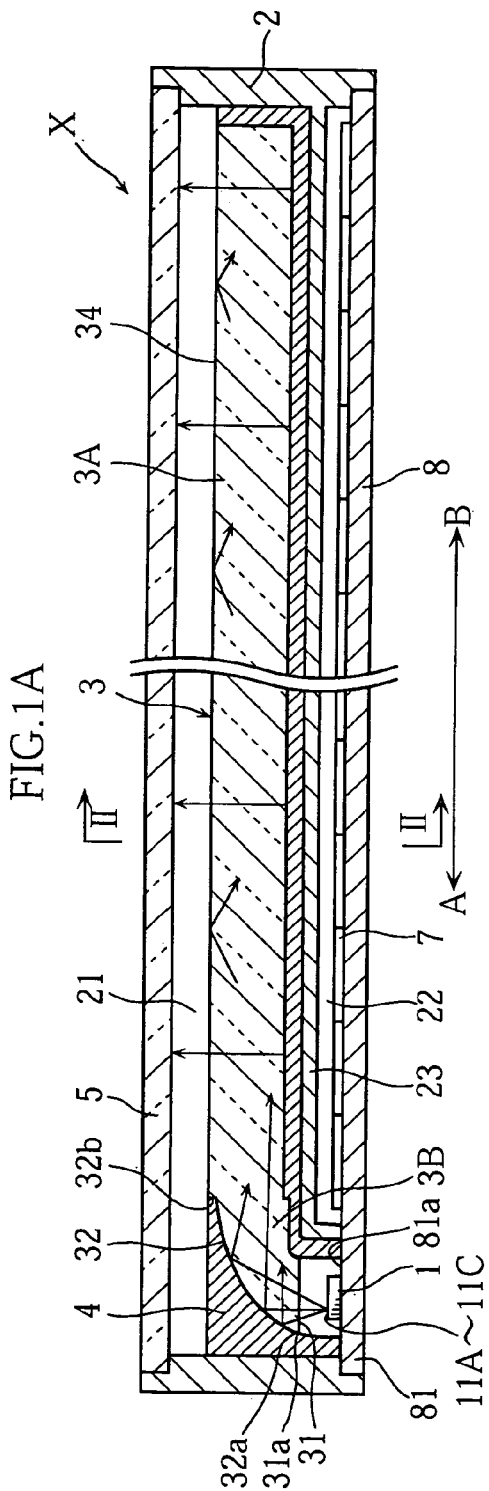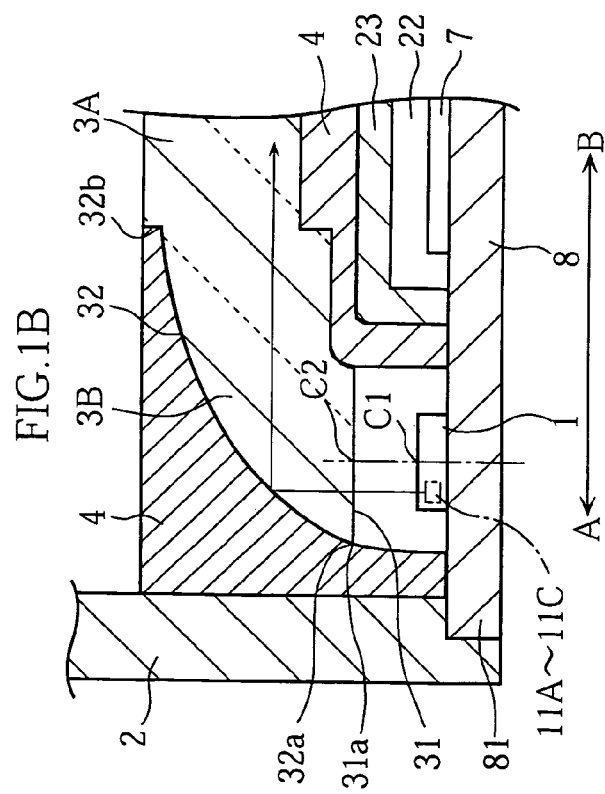

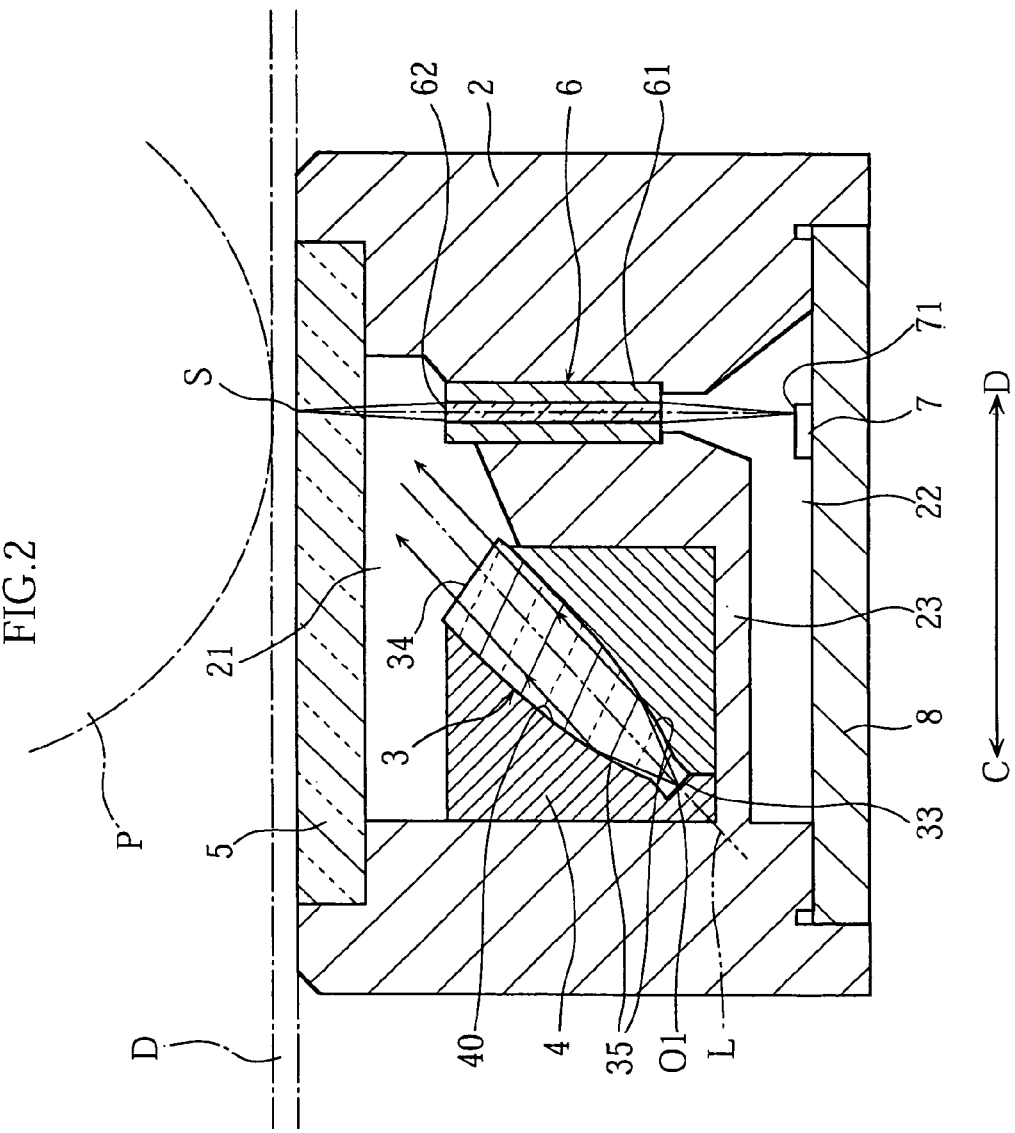

IMAGE READING DEVICE

TECHNICAL FIELD

The present invention relates to an image reading device for reading an image on a document, for example.

BACKGROUND ART

An example of an image reading device for reading an image printed on a document is disclosed in JP-A-H12-125080, for example. The conventional image reading device is described below with reference to FIGS. 5 and 6 of the present application.

As shown in FIG. 5, the image reading device 100 includes a light source 120 and a light guide 130. The light guide 130 guides light from the light source 120 to an image reading area S.

Specifically, the light guide 130 includes a subsidiary region 130a and a main region 130b. The subsidiary region 130a includes a light incident surface 131 for entrance of the light from the light source 120, and an inclined surface 132 for shifting the traveling direction of the light entering through the light incident surface 131. The main region 130b includes a main reflecting surface 133 for shifting the traveling direction of the light, which traveled from the subsidiary region 130a to the main region 130b, toward the image reading area S, and also includes a light emitting surface 134 for emitting the light toward the image reading area S. As shown in FIG. 6, the main reflecting surface 133 includes a plurality of recesses 135. The recesses 135, spaced from each other in the primary scanning direction (indicated by an arrow AB), shift the traveling direction of the light entering into the recesses 135, toward the image reading area S.

The light source 120 is a light-emitting diode (LED) chip. As shown in FIG. 6, the light passing portion of the light source 120 is positioned right below the center of the light incident surface 131 of the light guide 130 in the primary scanning direction. This arrangement is made for attaining uniform irradiation to the light incident surface 131 with the light from the light source 120.

In the image reading device 100, one way to increase the light irradiation toward the image reading area S (thereby obtaining a high-quality image) is to increase the amount of light emission from the light source 120.

However, the increase in the light emission from the source 120 entails higher power consumption at the light source 120, which is not desirable.

DISCLOSURE OF THE INVENTION

The present invention has been proposed under the above-described circumstances. An object of the present invention is to provide an image reading device for regulating the power consumption at a light source, while increasing the amount of light irradiation toward an image reading area.

An image reading device according to the present invention comprises: a light source; and a light guide including a main region extending in a primary scanning direction and a subsidiary region contacting with an end of the main region. The subsidiary region includes a light incident surface located above the light source. The subsidiary region further includes an inclined surface that is inclined toward the main region as proceeding upward, so that light entering the light incident surface and then traveling upward is reflected generally horizontally toward the main region. The main region includes a light emitting surface and a main reflecting surface provided with a light reflector for reflecting the light traveling from the subsidiary region to the main region, so that the light is emitted from the light emitting surface. The light source is offset in a direction receding from the main region with respect to a center of the light incident surface in the primary scanning direction.

Preferably, the image reading device according to the present invention further comprises a base plate on which the light source is mounted.

Preferably, the image reading device according to the present invention further comprises a resin packaging cover for accommodating the light source. The resin packaging cover includes a body made of a white resin and a light passing portion made of a transparent resin for causing light from the light source to emit from the resin cover.

Preferably, the light source includes a plurality of light-emitting diode chips arranged in an array extending in a secondary scanning direction.

Preferably, the light-emitting diode chips include a red diode, a green diode, and a blue diode.

Preferably, the main region of the light guide include a pair of side surfaces extending between the main reflecting surface and the light emitting surface. The side surfaces are parabolic and have a main axis coinciding with a line centered widthwise of the main region.

Preferably, the surfaces of the light guide are mirror-finished.

Preferably, the image reading device according to the present invention further comprises a reflector held in contact with the light guide.

Preferably, the light reflector includes a plurality of recesses spaced from each other in the primary scanning direction.

Other features and advantages of the present invention will be apparent from the following description of the embodiments.

BRIEF DESCRIPTION OF THE DRAWINGS

FIG. 1A is a section view illustrating an image reading device according to the present invention.

FIG. 1B is an enlarged view illustrating a principal part of FIG. 1A.

FIG. 2 is a section view taken along lines II-II of FIG. 1A.

BEST MODE FOR CARRYING OUT THE INVENTION

Figure 3:
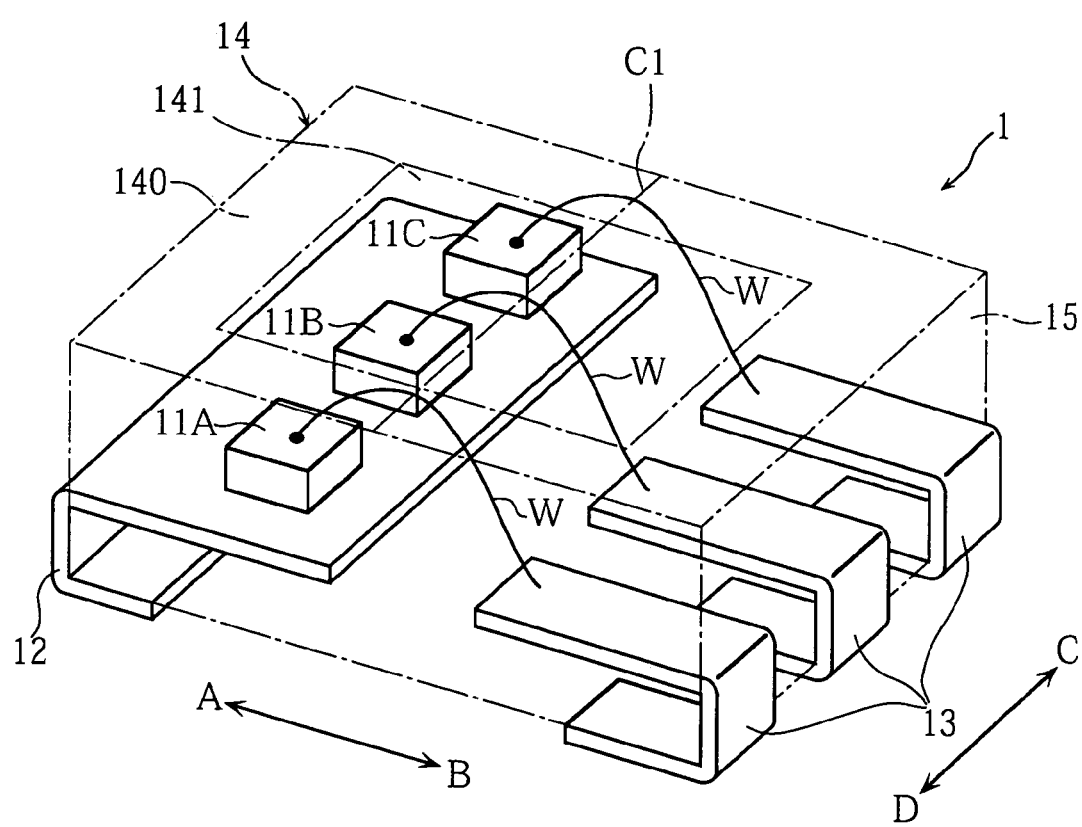
FIG. 3 is a perspective view illustrating a light source shown in FIG. 1.

A preferred embodiment of the present invention is described below with reference to FIGS. 1-4.

As shown in FIGS. 1-2, an image reading device X according to the present invention includes a light source 1, a case 2, a light guide 3, a reflector 4, a transparent plate 5, a lens array 6, a plurality of sensor IC chips 7, and a base plate 8.

As shown in FIG. 3, the light source 1 includes three LED chips 11A-11C, a first electrode 12, second electrodes 13, and a packaging cover 14. The light source 1 is mounted on an upper surface 81a of an end 81 of the base plate 8 (see FIG. 1A).

The first and the second electrodes 12, 13, made of an electroconductive metal such as copper, are spaced from each other in the primary scanning direction (indicated by an arrow AB). The first and the second electrodes 12, 13 include portions exposed out of the cover 14, and through the exposed portions, are electrically connected to wiring patterns (not shown) on the base plate 8. In the present embodiment, use is made of three second electrodes 13 spaced from each other in the secondary scanning direction (indicated by an arrow CD). The number of the electrodes is an example, and the present invention is not limited to this.

The LED chips 11A-11C are mounted on the first electrode 12 corresponding to the second electrodes 13 respectively, and emit light rays of different colors. Specifically, as shown in FIG. 1B, the LED chips 11A-11C are disposed nearer to the end 81 of the base plate 8 in relation to a center C1 of the light source 1 in the primary scanning direction, while being aligned in an array extending in the secondary scanning direction (the arrow CD) as shown in FIG. 3. The LED chips 11A-11C upwardly emit red, green, and blue light rays. Each of the LED chips 11A-11C is electrically connected to the corresponding second electrode 13 via a wire W made of gold, for example.

The cover 14 includes a body 140 and a light passing portion 141 through which light is emitted from the cover 14. The body 140 is made of a white resin having high light reflectance, while the light passing portion 141 is made of a transparent resin (e.g. epoxy resin) having high light permeability.

As shown in FIG. 1A, the case 2 is elongated in the primary scanning direction (the arrow AB). The case 2 includes first and second accommodation spaces 21, 22. The first accommodation space 21 accommodates the light source 1, the light guide 3, and the reflector 4. The second accommodation space 22 accommodates the sensor IC chips 7. The case 2 further includes a light shield 23. The light shield 23 separates the case into the first accommodation space 21 and the second accommodation space 22, and also prevents the sensor IC chips 7 from directly receiving light from the light source 1 or from receiving light traveling in the light guide 3. The case 2 is made of a synthetic resin, for example.

The light guide 3 includes a main region 3A elongated in the primary scanning direction and a subsidiary region 3B connected to an end of the main region 3A. The subsidiary region 3B guides light emitted from the LED chips 11A-11C to the main region 3A. The main region 3A causes the light traveling from the subsidiary region 3B to be emitted toward an image reading area S. The light guide 3 is made of a material having high transparency, such as PMMA (polymethylmethacrylate). The surfaces of the light guide 3 are mirror-finished. Due to this, the light traveling in the light guide 3 can be totally reflected on the mirror surfaces.

The subsidiary region 3B includes a light incident surface 31 for entrance of light emitted from the light source 1. The subsidiary region 3B further includes an inclined surface 32 for causing the light entering through the light incident surface 31 to proceed into the main region 3A. As well shown in FIG. 1B, the light incident surface 31 includes a center C2 in the primary scanning direction that is arranged right above the center C1. The LED chips 11A-11C are offset in a direction receding from the main region 3A with respect to the center C2 of the light incident surface 31. The surface 32 is inclined in a manner such that it comes closer to the main region 3A as proceeding upward from its bottom end 32a contacting with an end 31a of the light incident surface 31, until its top end 32b comes into contact with the main region 3A. The inclined surface 32 is curved such that the light traveling upward from the light incident surface 31 is reflected into horizontal light proceeding toward the main region 3A.

Figure 4:
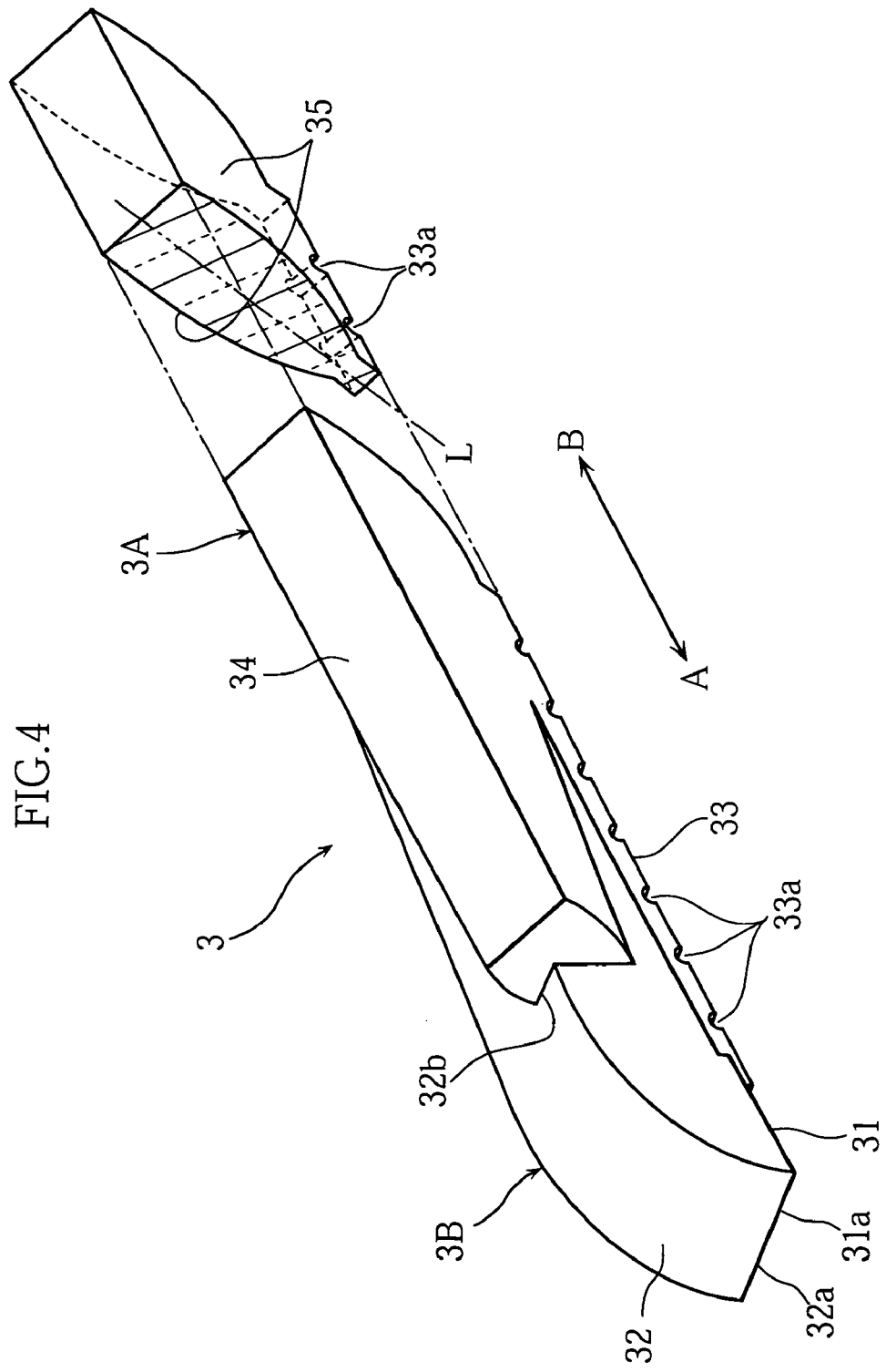
FIG. 4 is a perspective view illustrating a light guide shown in FIG. 1.
Figure 5:
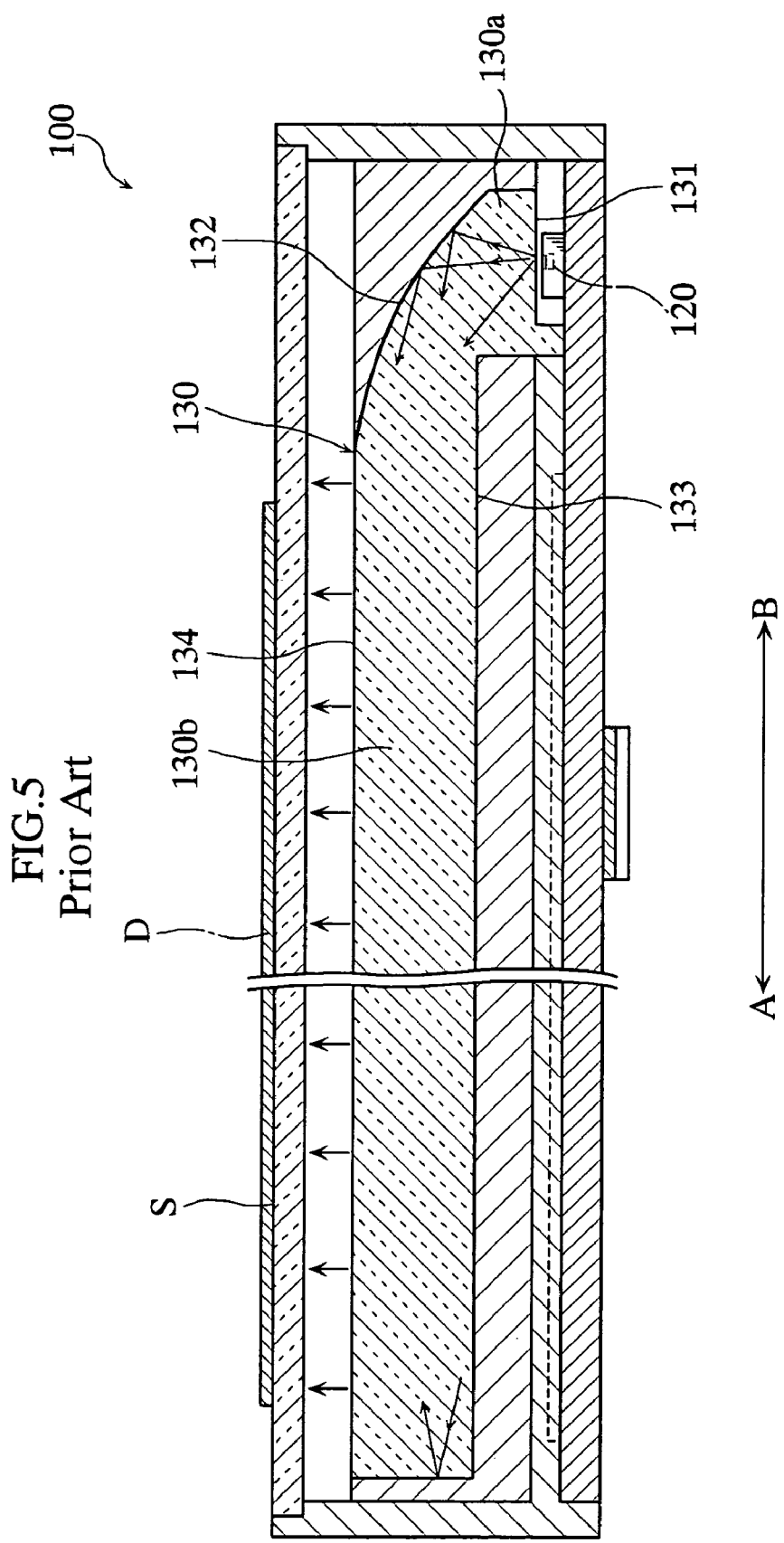
FIG. 5 is a section view illustrating an example of a conventional image reading device.
Figure 6:
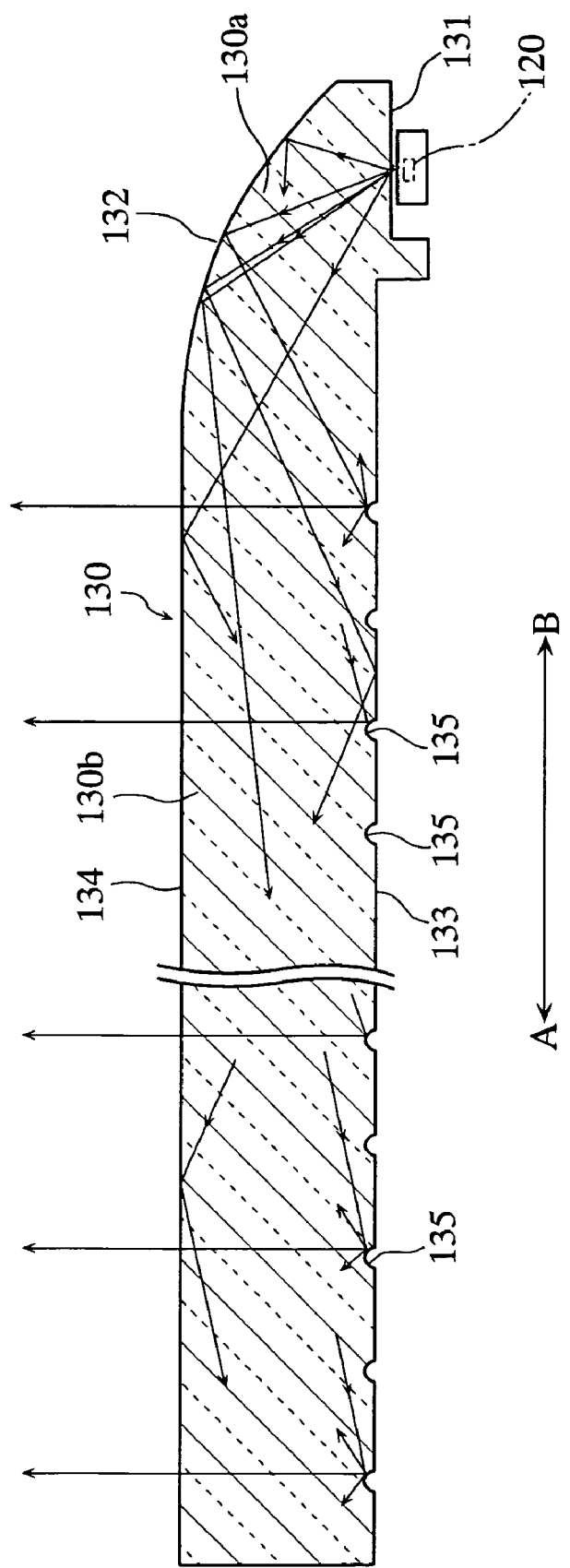
FIG. 6 is a section view illustrating a conventional light guide.

As shown in FIG. 4, the main region 3A includes a main reflecting surface 33 at the lower portion of the light guide 3 and a light emitting surface 34 facing to the image reading area S. The main region 3A further includes a pair of side surfaces 35 extending between the above-mentioned surfaces 33, 34. The main reflecting surface 33 is provided with a plurality of recesses 33a spaced from each other in the primary scanning direction (the arrow AB). The recesses 33a scatter the light traveling in the main region 3A. Each recess 33a is elongated widthwise of the main region 3A and arcuate in section. The side surfaces 35, having a common main axis L coinciding with the widthwise center line of the main region 3A, cooperate to form a parabolic surface. As shown in FIG. 2, the side surfaces 35 further have a common focus O1 on or in the vicinity of the main reflecting surface 33. With such an arrangement, the light reflected on the recesses 33a and the side surfaces 35 can be emitted toward the image reading area S from the light emitting surface 34 as a bundle of rays substantially parallel to the main axis L of the side surfaces 35.

The reflector 4 is formed with a groove 40 for holding the light guide 3. The reflector 4 covers the light guide 3 except for the light incident surface 31 and the light emitting surface 34, thereby preventing light leakage from portions other than the light emitting surface 34. The reflector 4 is made of a white synthetic resin having high light reflectance, for example.

The transparent plate 5 is attached to the upper surface of the case 2. The transparent plate 5 serves as a paper guide when a document D is transferred in the secondary scanning direction (arrow CD) by a platen roller P. The transparent plate 5 may be made of a synthetic resin or glass.

The lens array 6 focuses the reflection light from the document D onto the sensor IC chips 7. The lens array 6, elongated in the primary scanning direction, includes a synthetic resin holder 61 and a plurality of imaging lenses 62 held in an array within the holder 61.

Each of the sensor IC chips 7 is an elongated rectangular semiconductor chip having a photoelectric converting function, and includes a light receiver 71 for receiving light. The sensor IC chip 7 outputs image signals corresponding to the amount of light received at the light receiver 71. The sensor IC chips 7 are mounted on the base plate 8 right below the lens array 6.

The base plate 8 is attached on the lower surface of the case 2 and provided with connectors (not shown) for external power supply and for input-output of various signals. The upper surface of the base plate 8 is formed with wiring patterns (not shown) for electrically connecting the above-mentioned connectors to the light source 1 and to the sensor IC chips 7. The base plate 8 is made of ceramic, for example.

Next, the function of the image reading device X is described below.

As shown in FIG. 1, the LED chips 11A-11C of the image reading device X emit light, and the light enters into the subsidiary region 3B through the light incident surface 31 of the light guide 3. The light entering into the subsidiary region 3B is reflected on the inclined surface 32, and then enters into the main region 3A. The light entering into the main region 3A travels in the primary scanning direction (the arrow AB) as being totally reflected in the main region 3A. Meanwhile, the light is reflected on the recesses 33a (see FIG. 4) serving as a light reflector, and then emitted from the light emitting surface 34 toward the image reading area S.

As described above, the LED chips 11A-11C of the image reading device X are offset from the center C2 of the light incident surface 31 in the direction receding from the main region 3A. With such an arrangement, the light entering substantially perpendicular to the light incident surface 31 is reflected by the inclined surface 32 at portions lower than the reflecting portions of the conventional image reading device. As a result, the light reflected by the inclined surface 32 travels in the main region 3A along paths that are closer to the main reflecting surface 33 than in the conventional image reading device. It should be noted here that the light ray entering substantially perpendicular to the light incident surface 31 has the greatest brightness among light rays emitted from the LED chips 11A-11C. Thus, in the image reading device X, the light ray with the greatest brightness travels near the main reflecting surface 33. In this way, the amount of light rays reflected on the recesses 33a is larger than that of the conventional device, and the amount of light rays emitted from the light emitting surface 34 is also increased. As a result, the light irradiation efficiency at the image reading area S of the image reading device X is higher than the light irradiation efficiency of the conventional image reading device.

In the present invention, the recesses of the main reflecting surface 33 may be replaced with projections. Further, the main reflecting surface 33 may be provided with a coating which enables scattering reflection of light.

The present invention being thus described, it is obvious that the same may be modified in various ways. Such modifications should not be regarded as a departure from the spirit and scope of the invention, and all such modifications as would be obvious to those skilled in the art are intended to be included in the scope of the appended claims.

The invention claimed is:

1. An image reading device comprising:
   a light source; and
   a light guide including a main region extending in a primary scanning direction and a subsidiary region contacting with an end of the main region;
   wherein the subsidiary region includes a light incident surface located above the light source, and an inclined surface that is inclined toward the main region as proceeding upward, so that light entering the light incident surface and then traveling upward is reflected generally horizontally toward the main region,
   wherein the main region includes a light emitting surface, and a main reflecting surface provided with a light reflector for reflecting the light traveling from the subsidiary region to the main region, so that the light is emitted from the light emitting surface,
   wherein the light source is offset in a direction receding from the main region with respect to a center of the light incident surface in the primary scanning direction.

2. The image reading device according to claim 1, further comprising a base plate on which the light source is mounted.

3. The image reading device according to claim 1, further comprising a resin packaging cover for accommodating the light source, the resin packaging cover including a body made of a white resin and a light passing portion made of a transparent resin for causing light from the light source to emit from the resin cover.

4. The image reading device according to claim 1, wherein the light source includes a plurality of light-emitting diode chips arranged in an array extending in a secondary scanning direction.

5. The image reading device according to claim 4, wherein the light-emitting diode chips include a red diode, a green diode, and a blue diode.

6. The image reading device according to claim 1, wherein the main region of the light guide include a pair of side surfaces extending between the main reflecting surface and the light emitting surface, the side surfaces being parabolic and having a main axis coinciding with a line centered widthwise of the main region.

7. The image reading device according to claim 6, wherein the surfaces of the light guide are mirror-finished.

8. The image reading device according to claim 1, further comprising a reflector held in contact with the light guide.

9. The image reading device according to claim 1, wherein the light reflector includes a plurality of recesses spaced from each other in the primary scanning direction.

* * * * *